(12) United States Patent
Narita et al.

(10) Patent No.: US 7,455,607 B2
(45) Date of Patent: Nov. 25, 2008

(54) TENSIONER

(75) Inventors: Kinzo Narita, Nabari (JP); Junichi Wake, Nabari (JP); Simon Barrette, Aichi-ken (JP)

(73) Assignee: BorgWarner Morse TEC Japan K.K., Nabari-Shi (JP)

( * ) Notice: Subject to any disclaimer, the term of this patent is extended or adjusted under 35 U.S.C. 154(b) by 379 days.

(21) Appl. No.: 11/419,771

(22) Filed: May 23, 2006

(65) Prior Publication Data

US 2006/0281595 A1    Dec. 14, 2006

(30) Foreign Application Priority Data

Jun. 13, 2005 (JP) .............................. 2005-172565

(51) Int. Cl.
F16H 7/08 (2006.01)
F16H 7/22 (2006.01)
(52) U.S. Cl. ...................... 474/109; 474/110; 474/101
(58) Field of Classification Search ................ 474/109, 474/110, 101
See application file for complete search history.

(56) References Cited

U.S. PATENT DOCUMENTS 2,069,402 A * 2/1937 Cowlin ....................... 411/154
2,469,959 A * 5/1949 Frazier ........................ 277/480
4,099,298 A * 7/1978 Gimenez ........................ 24/27
4,411,638 A * 10/1983 Wilson ....................... 474/138
5,720,683 A * 2/1998 Patton ........................ 474/109
5,967,921 A * 10/1999 Simpson et al. ............. 474/110

FOREIGN PATENT DOCUMENTS

JP    2004-353758    12/2004

* cited by examiner

Primary Examiner—Thu Nguyen
Assistant Examiner—Henry Liu
(74) Attorney, Agent, or Firm—Brown & Michaels, PC

(57) ABSTRACT

A tensioner that includes a piston supported slidably in a piston bore formed in a housing, a piston spring biasing the piston in the protruding direction, and a circlip member having an expandable ring-shaped body that is engageable with the rack teeth of the piston. In the piston bore, the ring-shaped body of the circlip member is adapted to engage with an upper and lower stop surface. The rack teeth of the piston are formed in such a shape that when the ring-shaped body of the circlip member engages with the upper stop surface of the piston bore, the piston is permitted to move in the protruding direction and, when the ring-shaped body of the circlip member engages with the lower stop surface of the piston bore, the piston restricts movement in the retracting direction.

12 Claims, 4 Drawing Sheets

TENSIONER

REFERENCE TO RELATED APPLICATIONS

This application claims an invention which was disclosed in Japanese application number 2005-172565, filed Jun. 13, 2005, entitled "TENSIONER." The benefit under 35 USC § 119(a) of the Japanese application is hereby claimed, and the aforementioned application is hereby incorporated herein by reference.

BACKGROUND OF THE INVENTION

1. Field of the Invention

The present invention relates to a tensioner with a ratchet mechanism having a circlip member that engages with the rack teeth formed on the outer circumferential surface of a piston. More particularly, the invention relates to an improvement in structure to decrease an impact sound that occurs when the external force from the chain causes the piston to retract.

2. Description of Related Art

Generally, in timing chains for valve drives of internal combustion engines, camshaft chains in use for a camshaft-camshaft drive, and balancer chains, have tensioners that are used on the slack side of a chain to take up slack in the chain and to apply tension to the chain.

During operation, a piston of the tensioner presses against the chain to maintain tension in the chain. Also, during operation, when tension in the chain increases due to resonance of a chain span, an excessive shock load from the chain acts on the piston of the tensioner, causing the piston to retract into the housing of the tensioner.

In order to prevent such a retraction of the piston, a tensioner device with a ratchet mechanism has been used as shown in Japanese patent application laid-open publication No. 2004-353758.

The ratchet mechanism includes rack teeth formed on the outer circumferential surface of the piston, a pawl member housed in a pawl hole that extends perpendicular to a piston bore having pawl teeth engageable with the rack teeth of the piston, and a pawl coil spring that biases the pawl member into engagement with the rack teeth of the piston.

During operation, when the piston moves in the protruding direction, the rack teeth of the piston travel over the teeth of the pawl member and permit the movement of the piston in the protruding direction. When the piston moves in the retracting direction, the rack teeth of the piston engage with the pawl teeth of the pawl member, and the pawl member comes into contact with an end surface of the pawl hole with the rack teeth of the piston engaged with the pawl teeth of the pawl member, thereby restricting the movement of the piston in the retracting direction. When the prior art piston retracts, the pawl member traveling along with the piston impacts the end surface of the pawl hole and generates an impact sound.

Therefore, there is a need for a tensioner that is directed to decreasing the impact sound generated at the time of retraction of the piston of the tensioner with a ratchet mechanism.

SUMMARY OF THE INVENTION

A tensioner according to an aspect of the present invention includes a housing with a notch formed at an open end of a piston bore of the housing to connect with the piston bore, a piston slidably supported in the piston bore having rack teeth on its outer circumferential surface, a piston spring provided in the piston bore for biasing the piston in the protruding direction from the housing, and a circlip member formed of an expandable ring-shaped body engageable with the rack teeth of the piston with an operatable handle portion.

The handle portion of the circlip member extends to the outside of the housing through the notch of the housing. Inside the piston bore, an upper stop surface and a lower stop surface are formed that are engageable with the ring-shaped body of the circlip member. The rack teeth of the piston are formed such that when the ring-shaped body of the circlip member contacts the upper stop surface of the piston bore, protruding movement of the piston is allowed, and when the ring-shaped body of the circlip member contacts the lower stop surface of the piston bore, the retracting movement of the piston is restricted. The ring-shaped body of the circlip member has at least one wavy portion that is elastically deformable in the axial direction when impacting the lower stop surface of the piston bore. Alternatively, at least two wavy portions may be provided at radial opposite positions on the ring-shaped body.

In the first embodiment of the present invention, when the piston moves in the protruding direction, during operation, the circlip member fitted on the rack teeth of the piston travels along with the piston, and the ring-shaped body of the circlip member contacts and engages with the upper stop surface of the piston bore of the housing. In this state, when the piston moves further in the protruding direction, the rack teeth of the piston travel over the ring-shaped body of the circlip member and the movement of the piston in the protruding direction is thus permitted.

When the piston moves in the retracting direction, the circlip member fitted on the rack teeth of the piston travels along with the piston and the ring-shaped body of the circlip member contacts and engages with the lower stop surface of the piston bore of the housing. In this state, the piston is locked in the retracting direction through the engagement of the ring-shaped body of the circlip member with the rack teeth of the piston and the lower stop surface of the piston bore, and the movement of the piston in the retracting direction is thus restricted. Also, when the ring-shaped body of the circlip member comes into contact with the lower stop surface of the piston bore, the wavy portion of the ring-shaped body elastically deforms in the axial direction. Thereby, a shock is relieved when the ring-shaped body of the circlip member impacts the lower stop surface of the piston bore thus decreasing the impact sound at the time of retraction of the piston.

As with the first embodiment of the present invention, a tensioner according to a second embodiment of the present invention includes a housing with a notch formed at an open end of a piston bore of the housing to connect with the piston bore, a piston slidably supported in the piston bore having rack teeth on its outer circumferential surface, a piston spring provided in the piston bore for biasing the piston in the protruding direction from the housing, and a circlip member formed of an expandable ring-shaped body engageable with the rack teeth of the piston with an operatable handle portion.

The handle portion of the circlip member extends to the outside of the housing through the notch of the housing. Inside the piston bore are formed an upper stop surface and lower stop surface that are engageable with the ring-shaped body of the circlip member. The rack teeth of the piston are formed such that when the ring-shaped body of the circlip member contacts the upper stop surface of the piston bore, protruding movement of the piston is allowed, and when the ring-shaped body of the circlip member contacts the lower stop surface of the piston bore, retracting movement of the piston is restricted. A washer member provided on the lower stop surface of the piston bore is elastically deformable in the axial direction when the ring-shaped body of the circlip member impacts the washer member.

According to the second embodiment of the present invention, when the piston moves in the protruding direction during operation, the circlip member fitted on the rack teeth of the piston travels along with the piston, and the ring-shaped body of the circlip member contacts and engages with the upper stop surface of the piston bore of the housing. In this state, the rack teeth of the piston travel over the ring-shaped body of the circlip member and the movement of the piston in the protruding direction is thus permitted.

When the piston moves in the retracting direction, the circlip member fitted on the rack teeth of the piston travels along with the piston, and the ring-shaped body of the circlip member contacts and engages with the washer member disposed on the lower stop surface of the piston bore of the housing. In this state, the piston is locked in the retracting direction through the engagement of the ring-shaped body of the circlip member with the rack teeth of the piston and the washer on the lower stop surface of the piston bore, thus restricting the movement of the piston in the retracting direction. Also, when the ring-shaped body of the circlip member comes into contact with the washer member on the lower stop surface of the piston bore, the washer member elastically deforms in the axial direction. Thereby, a shock is relieved when the ring-shaped body of the circlip member impacts the washer member and the impact sound at the time of retraction of the piston is thus decreased.

The washer member may be a Belleville spring, a spring washer, or a wavy washer. The wavy washer has a plurality of circumferentially spaced wavy portions. At least two wavy portions may be provided at radial opposite positions on the washer member.

A clearance between the circlip member and the upper and lower stop surface of the piston bore allows axial movement of the circlip member inside the piston bore.

In this case, during operation, when the piston moves in the retracting direction, the circlip member fitted on the rack teeth of the piston travels the clearance formed between the circlip member and the lower stop surface. Thereby, when the increased tension in the chain applies an excessive shock load to the piston, the excessive shock load is prevented from directly and immediately acting on the ring-shaped body engaged with the rack teeth of the piston.

The tensioner may be a mechanical tensioner. In this case, there is no need to provide an oil circuit that makes the entire structure of the tensioner complicated, simplifying the structure and reducing the manufacturing cost.

DETAILED DESCRIPTION OF THE INVENTION

Figure 1:
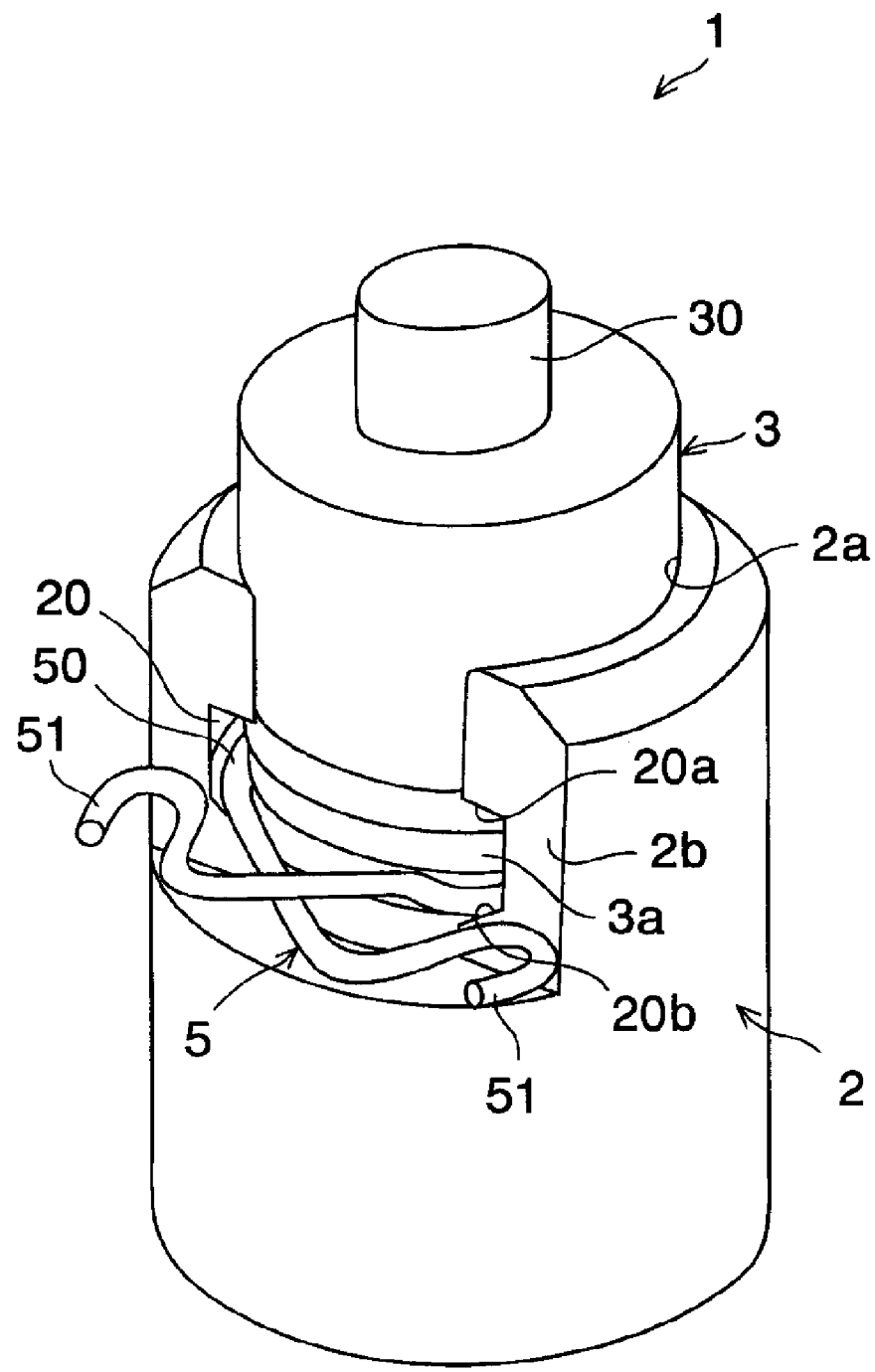
FIG. 1 shows a perspective view of a tensioner according to an embodiment of the present invention.
Figure 2:
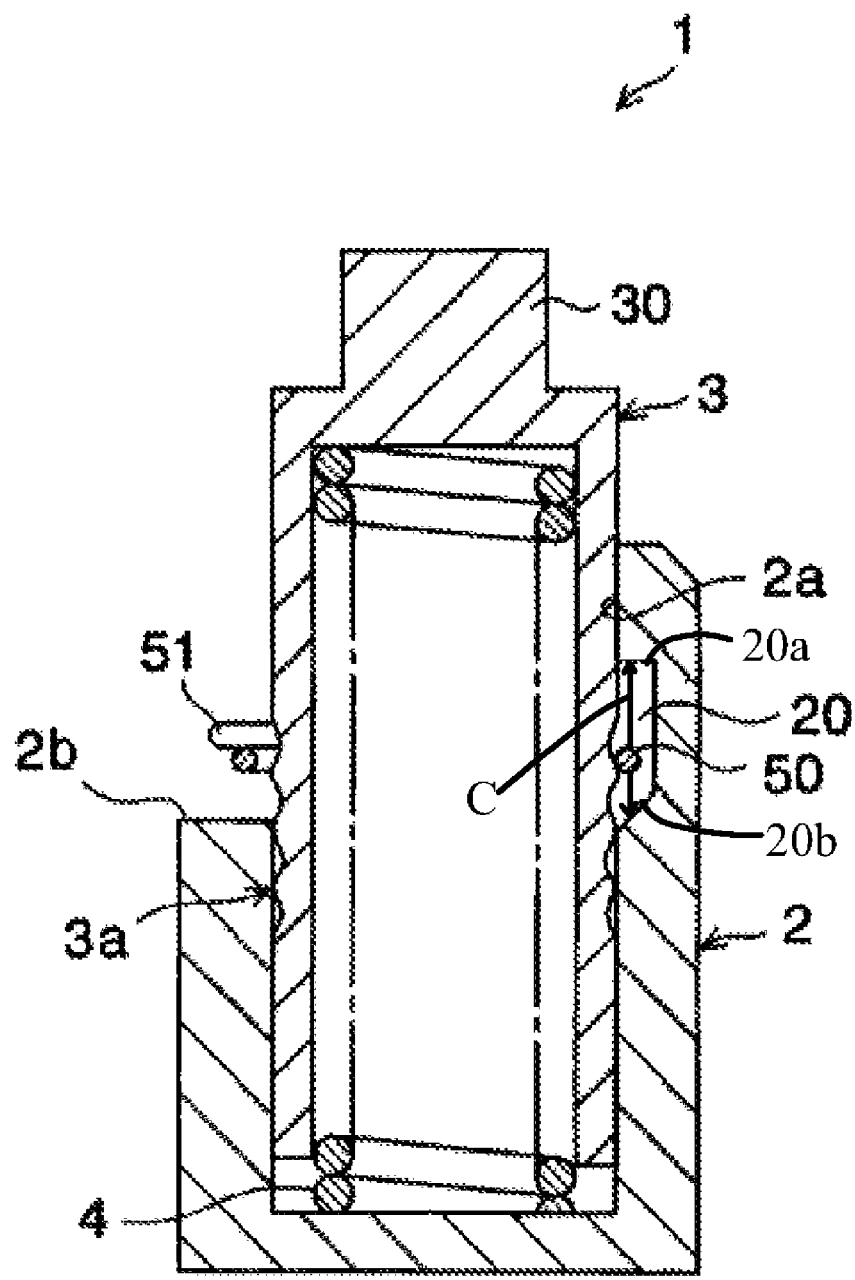
FIG. 2 shows a longitudinal sectional view of the tensioner of FIG. 1.
Figure 3:
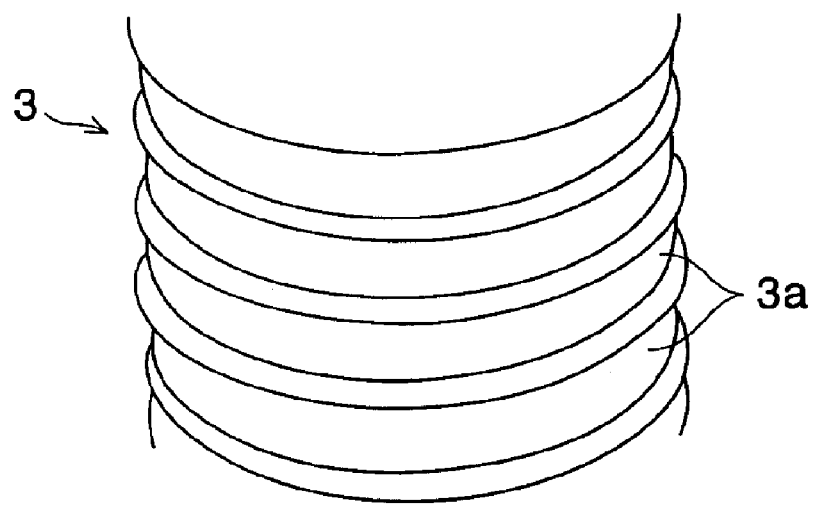
FIG. 3 shows a perspective view of a portion of the piston of FIG. 1.

FIGS. 1 to 5 show a tensioner according to an embodiment of the present invention. As shown in FIGS. 1 and 2, a tensioner 1 is comprised of a housing 2 having an axially extending piston bore 2a and a notch 2b formed at an open end of the piston bore 2a and radially connecting with the piston bore 2a. The hollow piston 3 is slidably supported in the piston bore 2a and has rack teeth 3a (see FIG. 3) formed on the outer circumferential surface of the piston 3. The piston is biased in the protruding direction from the housing by a piston spring 4 provided in the piston bore 2a. A circlip member 5 fits in the rack teeth 3a of the piston 3.

Figure 4:
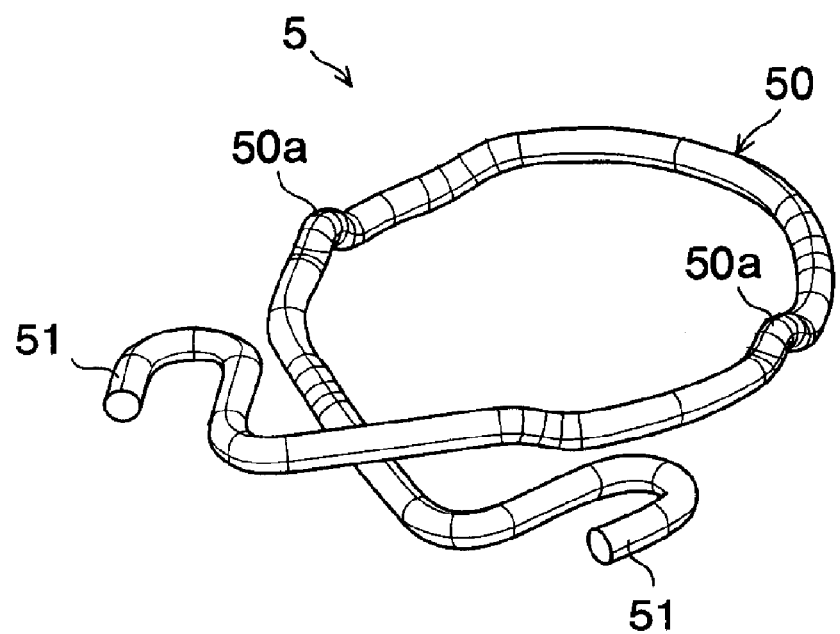
FIG. 4 shows a perspective view of a circlip member of FIG. 1.

As shown in FIG. 4, the circlip member 5 is formed of an expandable ring-shaped body 50 that is engageable with the rack teeth 3a of the piston 3, and has a pair of operatable handle portions 51 with which an operator may expand the ring-shaped body 50. The handle portions 51 extend to the outside of the housing 2 through the notch 2b formed in the housing 2. The ring-shaped body 50 has wavy portions 50a that protrude upwardly. The wavy portions 50a are adapted to be elastically compressed and deformed when a compressive force is applied to the wavy portions 50a in the axial direction. In this example, the wavy portions 50a are provided at two positions that are opposite each other in the radial direction. However, there may be three or more wavy portions present. A concave portion 20 on the inner circumferential surface of the piston bore 2a, extends circumferentially along the piston bore 2a. An upper stop surface 20a and a lower stop surface 20b, which the ring-shaped body 50 of the circlip member 5 is adapted to engage with are formed in the concave portion 20.

The rack teeth 3a of the piston 3 are formed such that when the ring-shaped body 50 of the circlip member 5 contacts and engages with the upper stop surface 20a of the concave portion 20 of the piston bore 2a, the movement of the piston 3 in the protruding direction is permitted. Whereas, when the ring-shaped body 50 of the circlip member 5 contacts and engages with the lower stop surface 20b of the concave portion 20 of the piston bore 2a, the movement of the piston 3 in the retracting direction is restricted.

During operation of the tensioner 1, when the piston 3 moves in the protruding direction, the circlip member 5 fitted in the rack teeth 3a of the piston 3 is transferred along with the piston 3, and the ring-shaped body 50 of the circlip member 5 contacts and engages with the upper stop surface 20a of the concave portion 20 of the piston bore 2a. In this state, the rack teeth 3a of the piston 3 travel over the ring-shaped body 50 of the circlip member 5 and the movement of the piston 3 in the protruding direction is permitted. During operation, the distal end portion 30 of the piston 3 applies a compressive force to the chain through a tensioner arm (not shown), thereby maintaining tension in the chain.

Figure 5:
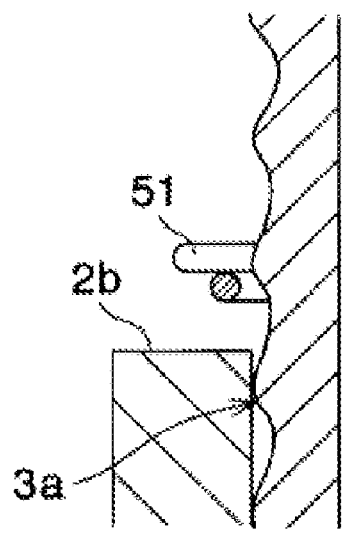
FIG. 5 shows an enlarged partial view of FIG. 2 illustrating the state where the piston is retracted.
Figure 5:
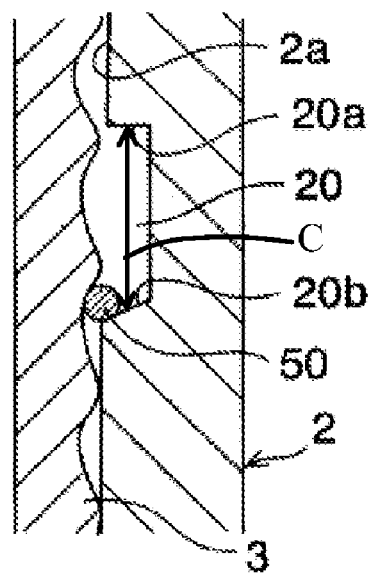

When the piston 3 moves in the retracting direction, the circlip member 5 fitted in the rack teeth 3a of the piston 3 is transferred along with the piston 3, and the ring-shaped body 50 of the circlip member 5 contacts and engages with the lower stop surface 20b of the concave portion 20 of the piston bore 2a (see FIG. 5). In this state, the piston 3 is locked in the retracting direction, restricting movement of the piston through the engagement of the ring-shaped body 50 of the circlip member 5 with the rack teeth 3a of the piston 3 and the lower stop surface 20b of the piston bore 2a.

Moreover, in this case, when the ring-shaped body 50 of the circlip member 5 contacts the lower stop surface 20b of the piston bore 2a, the wavy portions 50a of the ring-shaped body 50 elastically deform in the axial direction. Thereby, a shock may be relieved when the ring-shaped body 50 of the circlip member 5 impacts the lower stop surface 20b of the piston bore 2a, and decreasing an impact sound at the time of retraction of the piston.

Also, in this case, since a clearance C between the ring-shaped body 50 of the circlip member 5 and the upper and lower stop surface 20a, 20b is provided, axial movement of the circlip member 5 (see FIG. 2) is permitted when the piston 3 moves in the retracting direction. The circlip member 5 fitted in the rack teeth 3a of the piston 3 travels the length of the clearance C between the upper and lower stop surface. Thereby, even in the case where the increased chain tension applies an excessive impact load to the piston 3, the excessive impact load may be prevented from directly and immediately acting on the ring-shaped body 50 of the circlip member 5 engaged with the rack teeth 3a of the piston 3.

In the above-mentioned embodiment, the circlip member 5 is provided with wavy portions 50a, but the present invention is not limited to the previous embodiment.

Figure 6:
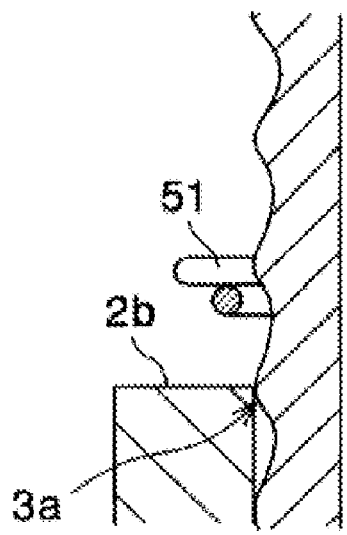
FIG. 6 shows another embodiment of the present invention, which corresponds to FIG. 5 in the above embodiment.
Figure 6:
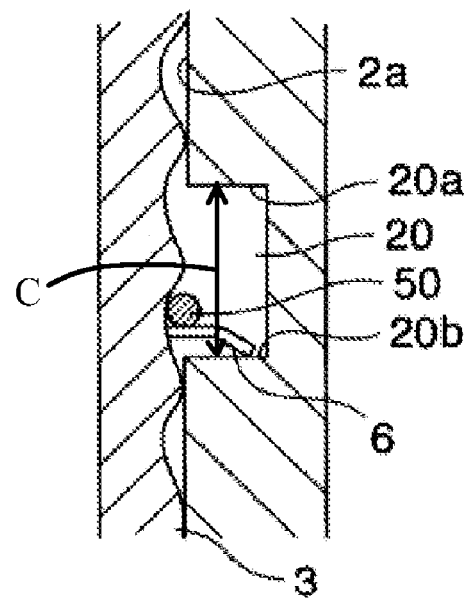

FIG. 6 shows another embodiment of the present invention. Like reference numbers indicate identical or functionally similar elements. FIG. 6 corresponds to FIG. 5 of the previous embodiment.

In FIG. 6, a Belleville spring 6 is provided as a washer member between the ring-shaped body 50 of the circlip member 5 and the lower stop surface 20b in the concave portion 20 of the housing 2. No wavy portions are formed on the circlip member 5.

During operation, when the piston 3 moves in the protruding direction, as with the previous embodiment, the circlip member 5 fitted in the rack teeth 3a and is transferred along with the piston 3 and the ring-shaped body 50 of the circlip member 5 contacts and engages with the upper stop surface 20a of the concave portion 20 of the piston bore 2a. In this state, the rack teeth 3a of the piston 3 travel over the ring-shaped body 50 of the circlip member 5 and the movement of the piston 3 in the protruding direction is permitted.

When the piston 3 moves in the retracting direction, the circlip member 5 fitted in the rack teeth 3a are transferred along with the piston 3 and the ring-shaped body 50 of the circlip member 5 contacts the Belleville spring 6 disposed on the lower stop surface 20b of the concave portion 20 of the piston bore 2a (see FIG. 6). In this state, the piston 3 is locked in the retracting direction through the engagement of the ring-shaped body 50 of the circlip member 5 with the rack teeth 3a of the piston 3 and the Belleville spring 6, restricting movement of the piston 3 in the retracting direction.

Also, in this case, when the ring-shaped body 50 of the circlip member 5 contacts the Belleville spring 6, the Belleville spring 6 elastically deforms in the axial direction in such a manner to decrease the height of the Belleville spring. Thereby, a shock may be relieved when the ring-shaped body 50 of the circlip member 5 impacts the bottom of the concave portion 20, and decreasing an impact sound at the time of retraction of the piston.

The washer member that is disposed in the concave portion 20 of the housing 2 is not limited to a Belleville spring, but may also be a spring washer or wavy washer. Both the spring washer and the wavy washer have a plurality of circumferentially spaced wavy portions.

In a third embodiment, the circlip member 5 with the wavy portions 50a of the first embodiment, shown in FIG. 4 may be combined with the Belleville spring, the spring washer, or the wavy washer of the second embodiment shown in FIG. 6.

In the above-mentioned embodiments, a mechanical tensioner was taken as an example of a tensioner. By adoption of the mechanical tensioner, a complicated hydraulic circuit can be eliminated, thereby simplifying the structure and decreasing a manufacturing cost. However, the present invention can be applied to a hydraulic tensioner.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for imparting tension to a chain comprising:
a housing having a piston bore extending axially including an open end with a notch connected radially to the piston bore, an upper stop surface and a lower stop surface;
a piston slidably supported in the piston bore comprising a plurality of rack teeth on the outer circumferential surface thereof;
a piston spring provided in the piston bore biasing the piston in a protruding direction from the housing; and
a circlip member comprising:
an expandable ring-shaped body engaged with the rack teeth of the piston having at least one wavy portion that elastically deforms in an axial direction, and
an operable handle portion for expanding the ring-shaped body extending outside of the housing through the notch connected radially to the piston bore;
wherein the rack teeth of the piston are formed such that when the ring-shaped body of the circlip member engages with the upper stop surface of the piston bore, the piston is permitted to move in the protruding direction and when the ring-shaped body of the circlip member engages with the lower stop surface of the piston bore, the piston is restricted to moving in the retracting direction and the wavy portions of the ring-shaped body of the circlip member deform in the axial direction.

2. The tensioner of claim 1, wherein at least two wavy portions are provided at radially opposite positions on the ring-shaped body.

3. The tensioner of claim 1, further comprising a clearance between the upper stop surface and the lower stop surface allowing axial movement of the circlip member.

4. The tensioner of claim 1, wherein the tensioner is a mechanical tensioner.

5. The tensioner of claim 1, further comprising a washer member provided on the lower stop surface of the piston bore elastically deformable in the axial direction when in contact with the ring-shaped body.

6. The tensioner of claim 5, wherein at least two wavy portions are provided at radially opposite positions on the washer member.

7. The tensioner of claim 5, wherein the washer member is a Belleville spring, a spring washer, or a wavy washer.

8. A tensioner for imparting tension to a chain comprising:
a housing having a piston bore extending axially including an open end with a notch connected radially to the piston bore, an upper stop surface and a lower stop surface;
a piston slidably supported in the piston bore comprising a plurality of rack teeth on the outer circumferential surface thereof;
a piston spring provided in the piston bore biasing the piston in a protruding direction from the housing; and
a circlip member comprising:
an expandable ring-shaped body engaged with the rack teeth of the piston, and
an operable handle portion for expanding the ring-shaped body extending outside of the housing through the notch connected radially to the piston bore;

a washer member in contact with the lower stop surface of the piston bore elastically deformable in the axial direction when in contact with the ring-shaped body of the circlip member;

wherein the rack teeth of the piston are formed such that when the ring-shaped body of the circlip member engages with the upper stop surface of the piston bore, the piston is permitted to move in the protruding direction and when the ring-shaped body of the circlip member engages with the washer member in contact with the lower stop surface of the piston bore, the piston is restricted to moving in the retracting direction and the washer member deforms in the axial direction.

9. The tensioner of claim 8, wherein the washer member is a Belleville spring, a spring washer, or a wavy washer.

10. The tensioner of claim 8, further comprising a clearance between the upper stop surface and the lower stop surface allowing axial movement of the washer member.

11. The tensioner of claim 8, wherein the tensioner is a mechanical tensioner.

12. The tensioner of claim 8, wherein the washer member further comprises at least two wavy portions at radially opposite positions.

* * * * *